United States Patent [19]

Yoshinaka et al.

[11] 4,454,530
[45] Jun. 12, 1984

[54] COLOR FRAMING SIGNAL GENERATOR

[75] Inventors: Tadaaki Yoshinaka, Hadano; Kanji Yamashita, Sagamihara, both of Japan

[73] Assignee: Sony Corporation, Tokyo, Japan

[21] Appl. No.: 250,074

[22] Filed: Apr. 1, 1981

[30] Foreign Application Priority Data

Apr. 11, 1980 [JP] Japan .................. 55-48481

[51] Int. Cl.³ ..................... H04N 9/62; H04N 9/535
[52] U.S. Cl. ................................. 358/10; 358/19
[58] Field of Search ............... 358/8, 10, 17, 19, 20, 358/22, 319, 326

[56] References Cited

U.S. PATENT DOCUMENTS

| | | | |
|---|---|---|---|
| 3,862,365 | 1/1975 | Kobayashi | 358/17 |
| 3,974,520 | 8/1976 | Kroyanagi | 358/17 |
| 4,052,733 | 10/1977 | Derenbecher, Jr. | 358/19 |
| 4,153,911 | 5/1979 | Isono | 358/10 |
| 4,268,853 | 5/1981 | Nakamura | 358/17 |

Primary Examiner—Tommy P. Chin

[57] ABSTRACT

A color framing signal generator having a LED (light emitting diode) indicator is disclosed, wherein phase relations between a color burst signal and a horizontal sync (synchronizing) pulse of an incoming composite color video signal are indicated by the LED indicator. The generator has a mode selection switch and an adjustment volume. When the mode selection switch is changed to an adjust position, the phase of a generated color subcarrier signal to be supplied to a color frame detecting circuit is able to be shifted to more desired phase for stable color framing detection.

11 Claims, 7 Drawing Figures

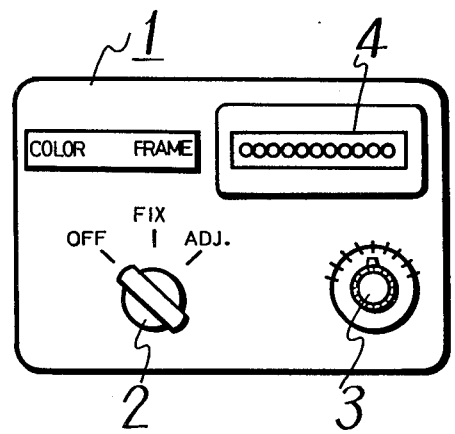
FIG. 1A
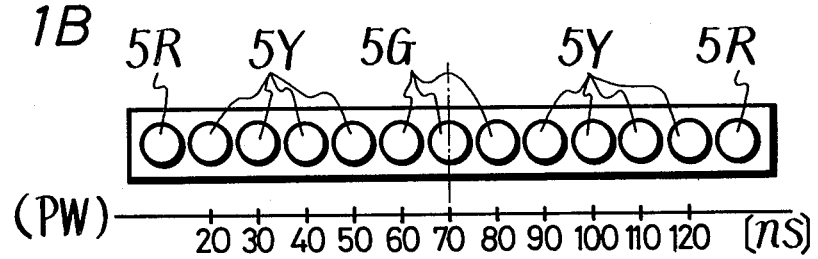
FIG. 1B
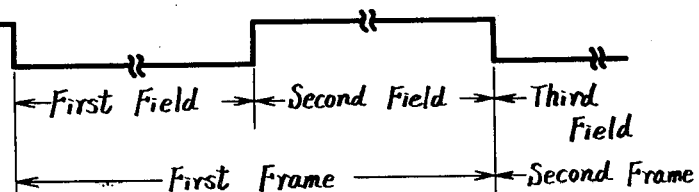
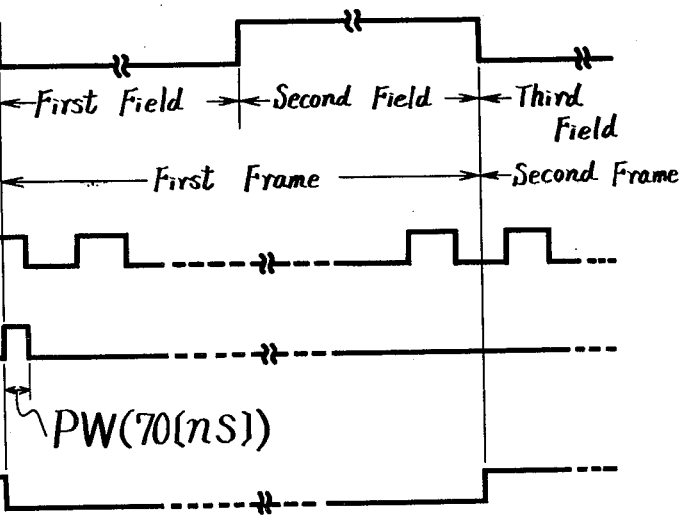

COLOR FRAMING SIGNAL GENERATOR

BACKGROUND OF THE INVENTION

1. Field of the Invention

This invention relates to a color framing signal generator, and particularly to such a generator that can properly indicate the phase difference between a horizontal sync signal and a color burst signal included in an incoming composite color video signal.

2. Description of the Prior Art

In general, in order to detect the color frame of a color video signal, the phase relation between its horizontal sync (synchronizing) pulse and its color burst signal is examined. However, the signal standard relating to the phase relation between the horizontal sync signal and the color burst signal is not very precise. For this reason, there is a defect in the prior art wherein the phase of the color framing pulse relative to the same color video signal tends to vary due to jitter etc.

Further, in the prior art apparatus, a device is not provided to indicate the phase relationship between the horizontal sync pulse of an incoming video signal and the color burst signal, so that even when an error is contained in the color framing operation, such error will not be indicated.

SUMMARY OF THE INVENTION

Accordingly, an object of the present invention is to provide a novel color framing signal generator.

Another object of the invention is to provide a novel color framing signal generator which is provided with an indicator device for indicating the phase relationship between the color burst signal and the horizontal sync pulse of an incoming color video signal.

A further object of the invention is to provide a new color framing signal generator which can indicate digitally the phase relationship between the color burst signal and the horizontal sync pulse of an incoming color video signal and which uses a plurality of LEDs (light emitting diodes).

A yet further object of the invention is to provide a color framing signal generator in which the phase-locked loop for detecting the color framing signal can be phase-controlled and a stable color framing pulse can be generated.

According to an aspect of the present invention, a color framing pulse generator is provided, which comprises:

(A) a burst lock oscillator means for continuously generating a color subcarrier signal in association with a color burst signal derived from an incoming color video signal;

(B) a framing pulse generator means for generating framing pulses in association with horizontal and vertical sync pulses derived from said incoming color video signal;

(C) a color framing pulse generator means for generating a color framing pulse based on said generated framing pulses and said color subcarrier signals; and (D) indicator means for indicating the phase relationship between said color burst signal and the horizontal sync pulses included in said incoming color video signal.

The other objects, features and advantages of the present invention will become apparent from the following description taken in conjunction with the accompanying drawings.

BRIEF DESCRIPTION OF THE DRAWINGS

FIG. 1A illustrates the front panel of the invention;
FIG. 1B illustrates the phase indicator;
FIGS. 3A–3D are plots of wave forms in the invention.

DESCRIPTION OF THE PREFERRED EMBODIMENTS

Figure 2:
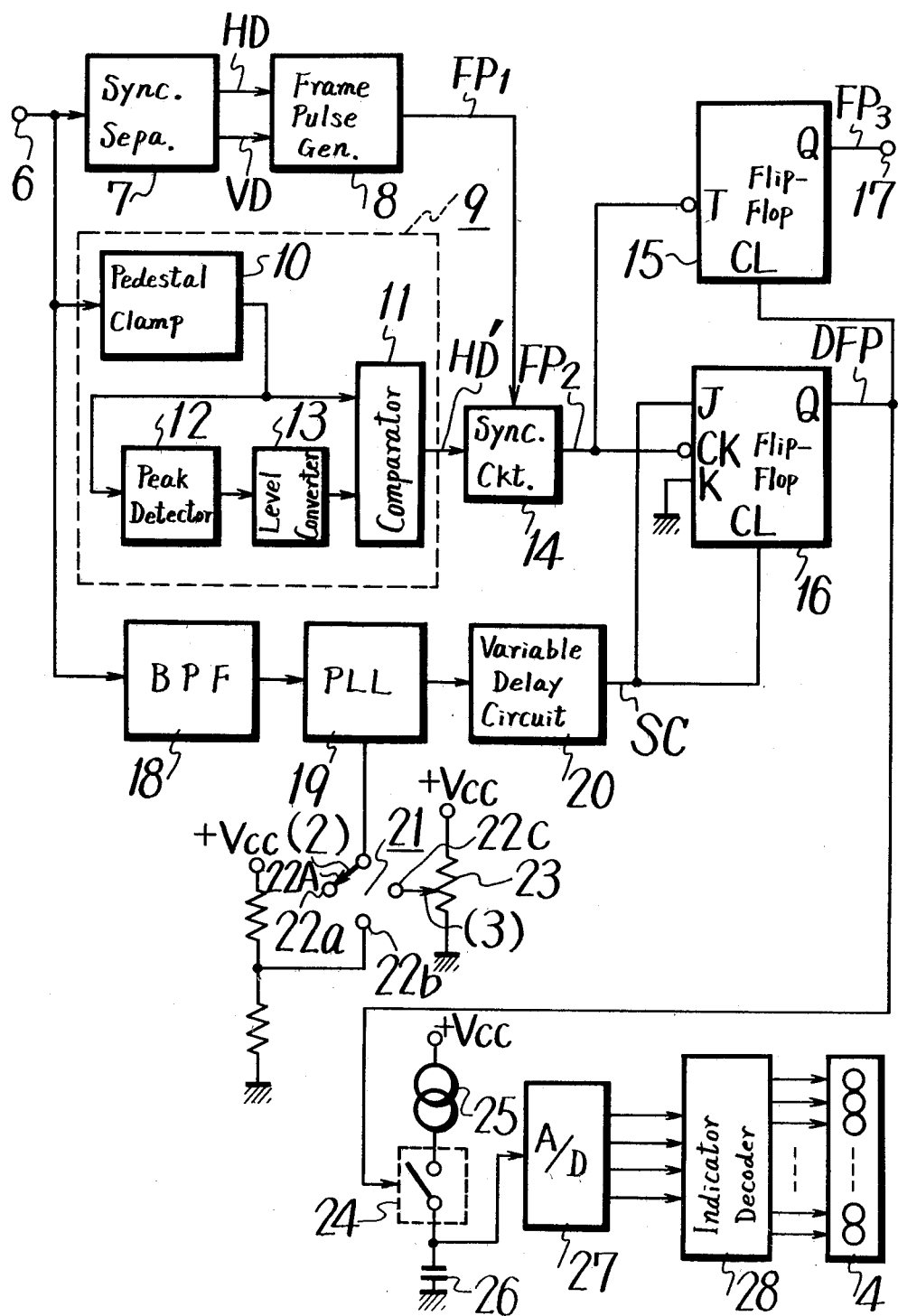
FIG. 2 is a block diagram of the invention.

An example of the color framing signal generator according to the present invention will be hereinafter described with reference to the attached drawings.

FIG. 1A shows a front panel 1 of an example of the color framing signal generator according to the invention. On the front panel 1, there are mounted a knob 2 for a switch to be described later, an adjusting knob 3 for a variable resistor and a phase difference indicator panel 4. As shown in FIG. 1B in an enlarged scale, the phase difference indicator panel 4 consists of aligned display elements such as LEDs (light emitting diodes) arranged in the lateral direction. In a particular example, there are 3 green LEDs 5G positioned in the center portion, 4 yellow LEDs 5Y positioned at both sides of the center LEDs 5G, and two red LEDs 5R with one positioned at both ends of the color display panel. One of the LEDs is illuminated in response to the phase difference between the detected horizontal sync signal and a reference color subcarrier. In the NTSC color television system, a color subcarrier frequency $f_{sc}$ is selected as $f_{sc}=(455/2) \times f_h$ where $f_h$ is the horizontal frequency and its ¼ period (90°) is 70 nano sec (ns). As will be described later, in the example of the invention, a detecting pulse DFP with a pulse width PW which varies with the phase difference is provided so that it is possible to detect a phase difference within the range of $\pm 90°$ (or PW=70∓70 (ns)). The pulse width PW of the detecting pulse DFP shown in FIG. 1B, determines which one of the LEDs is illuminated. For example, when the phase difference is small and the pulse width PW is 70±15 (ns), one of the LEDs 5G is illuminated. In an extreme case when the phase difference is large and the pulse width PW becomes smaller than 15 ns or larger than 125 ns, one of the LEDs 5R will be illuminated. Depending upon the polarity of the phase difference, one of the LEDs located at one side of the center LED will be illuminated.

FIG. 2 shows an example of the circuit diagram of the present invention in which an input terminal 6 receives an incoming composite color video signal. The color video signal applied to the input terminal 6 is fed to a sync separating circuit 7, a pedestal clamp circuit 10 and a band pass filter 18, respectively. Horizontal and vertical sync signals HD and VD separated from the composite color video signal in the sync separating circuit 7 are fed to a frame pulse generating circuit 8 which produces a frame pulse FP₁ of the frame period. The pedestal clamp circuit 10 produces a color video signal whose pedestal level is clamped at a predetermined level and supplies it to a level comparator 11 and to a peak detecting circuit 12. The peak detecting circuit 12 detects the sync tip level of the horizontal sync signal of negative polarity and supplies the detected sync tip level to a level converter 13 which in turn reduces the sync tip level by ½ and supplies its output to the level comparator 11. The level comparator 11 produces a horizontal sync signal HD′. The pedestal clamp circuit 10, level comparator 11, peak detecting circuit 12 and level converter 13 comprise a horizontal sync separating circuit 9. Since the phase difference between the horizontal sync signal and the reference color subcarrier is usually normalized relative to the ½ position of the amplitude at the front (rising-up) edge of the horizontal sync signal as a reference, the horizontal sync signal HD′ is required to have a rising or falling edge in coincidence with this level of the horizontal sync signal of the incoming video signal.

The phase of the frame pulse $FP_1$, which is generated at the frame pulse generating circuit 8 based upon the output from the sync separating circuit 7, is extremely accurate, and the frame pulse $FP_1$, is fed for synchronization to a sync circuit 14 with the horizontal sync signal HD′. A synchronized frame pulse $FP_2$ delivered from the sync circuit 14 is supplied to a T-type flip-flop 15 and also to a JK-type flip-flop 16. An output $FP_3$ derived from the T-type flip-flop 15 is delivered to an output terminal 17 as a color frame pulse (2 frame periods). A detecting pulse DFP derived from the JK-type flip-flop 16 is supplied to a clear terminal CL of the T-type flip-flop 15 and is also used to drive the phase difference display 4.

A band pass filter 18 serves to extract a burst signal from the incoming color video signal. In fact, the band pass filter 18 is formed of a band pass filter and a burst gate circuit. The burst signal separated in the band pass filter 18 is fed to a PLL (phase locked loop) circuit 19 which produces a continuous wave signal having the same frequency and the same phase as the incoming burst signal. This continuous wave signal is supplied to a variable delay circuit 20 and a continuous wave (reference color subcarrier) SC appearing at the output of delay circuit 20 is supplied to the J-input and the clear input of the JK-type flip-flop 16. A K-input of the flip-flop 16 is made "0", and the output DFP from the flip-flop 16 becomes "1" only when the J-input thereof is "1" at the timing of the clock input which it receives.

A change-over switch 21 is provided in association with the PLL circuit 19, and a movable contact 22A can be selectively changed to one of three fixed contacts 22a, 22b and 22c by rotating the knob 2.

The fixed contact 22a corresponds to an off state, the contact 22b to a fixed state and the contact 22c an adjustable state, respectively.

A predetermined voltage is supplied to the fixed contact 22b and a variable voltage is supplied to the fixed contact 22c, as shown in FIG. 2. For generating a variable voltage, a variable resistor 23 is provided, and a movable contact of the variable resistor 23 is connected to the fixed contact 22c of the change-over switch 21 so as to vary the voltage. The movable contact of the variable resistor 23 is moved by rotating the knob 3. The output from the change-over switch 21 is used to control the phase comparating condition of the PLL circuit 19. In detail, when the movable contact 22A of the change-over switch 21 is moved to the fixed contact 22b for supplying the predetermined voltage to the PLL circuit 19, the PLL circuit 19 produces a continuous wave in synchronism and in-phase with the burst signal. When the movable contact 22a engages the fixed contact 22c, the phase of the output from the PLL circuit 19 varies in response to the voltage level applied thereto from the contact 22c.

A switch 24, which is ON during the period of the pulse width PW of the detected pulse DFP from the JK-type flip-flop 16, is connected between a constant current source 25 and a capacitor 26 and converts the pulse width PW to an analog voltage across the capacitor 26. The obtained analog voltage is fed through a buffer (not shown) to an A/D converter 27 for generating a digital signal of a number of bits which is fed to an indicator decoder 28. The indicator decoder 28 produces outputs at its output terminals in response to the output from the A/D converter 27 to cause selected LEDs in the phase difference indicator panel 4 connected to the above output terminal to be illuminated. As described above a predetermined LED emits light in response to the pulse width PW of the detecting pulse DFP.

With the above described example of the invention, the standard composite color video signal is applied to the input terminal 6, and then the initial adjustment is carried out.

FIG. 3A shows the frame pulse $FP_2$ produced by the sync circuit 14. The falling-down edge of the frame pulse $FP_2$ is used as the clock input for the JK-type flip-flop 16. The falling-down edge appears at the start of the first and third fields. The discrimination between the first and third fields is performed by the phase of the continuous wave generated from the PLL circuit 19. By way of example, in accordance with a recent certain normalization, a burst signal of 9 cycles has to be inserted in a portion 19 cycles after the horizontal sync signal. Accordingly, the continuous wave SC becomes high level "1" when the frame pulse $FP_2$ falls down in the first field, and the continuous wave SC becomes low level at the falling down edge of the frame pulse $FP_2$ in the third field.

The variable delay circuit 20 is so adjusted that the first falling-down edge of the frame pulse $FP_2$ in the first field is positioned at the center of the delayed continuous wave SC of its "1" period, as shown in FIG. 3B. This adjustment can be carried out by using a meter, an oscilloscope of other apparatus. When the signals are so adjusted to have the above described phase relation, the pulse width PW of the detecting pulse DFP delivered from the JK-type flip-flop 16 becomes 70 ns as shown in FIG. 3C for the normalized color video signal. Further, the detecting pulse DFP is generated only at the beginning of the first field in the four cyclic fields. Accordingly, the color frame pulse $FP_3$ delivered to the output terminal 17 is a normalized color frame signal of two frame periods which becomes "0" in the first frame and "1" in the second frame as shown in FIG. 3D. While, the constant current delivered from the constant current source 25 is adjusted so that when the pulse width PW of the detecting pulse DFP is 70 ns, the LED 5G in the center of the phase difference indicator member 4 is illuminated. After the above initial adjustment is completed, the variable delay circuit 20 and the constant current source 25 are no longer adjusted.

The reproduced output from a VTR (video tape recorder) and so on is fed to the input terminal 6, and then the practical generation of the color frame signal and the phase difference detection for the incoming color video signal are carried out. In general, similar to the initial adjustment, the change-over switch 21 is changed over so that the movable contact 22A thereof is connected to its fixed contact 22b so it is in the fixed state. The practical incoming composite color video signal does not always have the normal relation between the frame pulse $FP_2$ and the continuous wave SC as shown in FIGS. 3A and 3B. For example, if the color video signal reproduced from the VTR is such that it is based upon rougher normalization, the phase difference will be large and the pulse width PW of the detecting pulse DFP will be larger or smaller than 70 ns. This pulse width PW is varied within the range of 70±70 (ns), so that the phase difference within the range of ±90° can be detected and one of the LEDs in the phase difference indicator member 4 will be illuminated. Accordingly, it will be known by observing the LED which is illuminated that the phase difference is small. Then, while watching the phase difference indicator panel 4, the phase difference is made zero in the source of the incoming color video signal by adjusting, for example, the phase of one color subcarrier. Such adjustment is possible if the incoming color video signal is obtained from a digital VTR, time base correcting apparatus, frame synchronizer or other apparatus. At this time, the color frame signal $FP_3$ in synchronism with the incoming color video signal is obtained at the output terminal 17 and, this color frame signal $FP_3$ may be used for electronic editing or the like.

When a phase difference condition is detected such that a color video signal source is one such that the phase of its color subcarrier cannot be adjusted at a prestage of the generator and one of the LEDs 5Y is illuminated, the knob 2 is rotated to change over the switch 21 to the adjusting position in which its movable contact 22A is in contact with its fixed contact 22c. Then the adjusting knob 3 is rotated to change the variable resistor 23, whereby the voltage appearing at the fixed terminal 22c of the change-over switch 21 is varied to adjust the phase of the continuous wave SC and to cause the center one of the LEDs 5G to be illuminated. By this adjustment the generation of the color frame signal $FP_3$ becomes more stable and an erroneous operation because the color frame signal $FP_3$ does not correspond to the incoming video signal can be avoided. If the color video signal source is one such that the phase of its color subcarrier cannot be adjusted and if the phase difference is rather large and one of the LEDs 5R is illuminated, the above adjusting operation can no longer be used. In other words, this case implies that the incoming color video signal has deviated a large amount from the normalized one and the illumination of one of the LEDs 5R is an alarm.

As may be understood from the above description on one example of the present invention, according to the invention the detecting pulse DFP is used for both the generation of the color frame signal $FP_3$ and the indication of the phase difference, so that the apparatus can be simple in construction. Further, when the phase difference between the horizontal sync signal and the burst signal is within an acceptable range but is large, the phase of the continuous wave which is produced based on the burst signal is varied to perform stable detecting operation and hence carry out the stable generation of the color frame signal. In addition, when the phase difference is too large to be tolerable, an alarm will be given. This invention is very practical and useful.

The above description is given for the case where the example of the invention is applied to process the color video signal of the NTSC system, but the same results are obtained when the invention is applied to process color video signals of other systems such as the PAL system, PAL-M system and so on. In case of the PAL system, the phase of the color subcarrier is varied with 8 fields as a period.

The above description is of a single preferred embodiment of the invention, but it will be apparent that many modification and variation could be effected by one skilled in the art without departing from the spirit or scope of the novel concepts of the invention and the spirit and scope of the invention are to be determined only by the appended claims.

We claim as our invention:
1. A color framing pulse generator comprising:
(A) a burst lock oscillator means for continuously generating a color subcarrier signal in association with a color burst signal derived from an incoming color video signal;
(B) a framing pulse generator means for generating framing pulses in association with horizontal and vertical sync pulses derived from said incoming color video signal;
(C) a phase relationship detecting means for detecting a phase relationship between said color subcarrier signal and said framing pulses;
(D) a frequency divider means for dividing said framing pulses, said frequency divider means being cleared by an output signal of said phase relationship detecting means; and
(E) an indicator means being supplied said output signal of said phase relationship detecting means for indicating said phase relationship between said color subcarrier signal and said framing pulses.

2. A color framing pulse generator as claimed in claim 1, further comprising means for adjusting the relative phase between said framing pulses and said color subcarrier signals.

3. A color framing pulse generator as claimed in claim 2, wherein when said adjusting means is actuated, said indicator means continually indicates the phase relationship between said color subcarrier signals and said framing pulses.

4. A color framing pulse generator as claimed in claim 3, wherein said indicator includes a plurality of lamps or LEDs for indicating said phase relationships.

5. A color framing pulse generator for color video signals comprising, a frame pulse generator receiving an incoming color video signal and producing a framing pulse $FP_1$, a horizontal sync separating circuit receiving said incoming color video signal and separating a horizontal sync signal, a sync circuit receiving the outputs of said frame pulse generator and said horizontal sync separating circuit, a burst signal generator receiving said incoming color video signal, a first flip-flop receiving outputs of said sync circuit and said burst signal generator and producing an output indicative of the phase difference between a color burst signal and a horizontal sync signal and an indicator connected to said first flip-flop circuit and indicating said phase difference.

6. A color framing pulse generator according to claim 5 including a second flip-flop circuit which receives outputs from said sync circuit and said first flip-flop and produces a color frame signal.

7. A color framing pulse generator according to claim 5 wherein said horizontal sync separating circuit includes a pedestal clamp, a peak detector connected to said pedestal clamp, a level shifter receiving the output of said peak detector and a level comparator receiving output signals of said pedestal clamp and said level shifter and supplying an output to said sync circuit.

8. A color framing pulse generator according to claim 5 wherein said color burst signal generator comprises a band pass filter and a burst gate circuit which extracts a burst signal from the incoming composite video signal, a phase locked loop circuit receiving the output of said band pass filter and said burst gate circuit, and a delay means receiving the output of said phase locked loop circuit and supplying outputs to said first flip-flop.

9. A color framing pulse generator according to claim 8 including switch means for supplying an input bias signal to said phase locked loop circuit.

10. A color framing pulse generator according to claim 5 wherein said indicator comprises a panel having a plurality of aligned illuminating means which are illuminated to indicate said phase difference.

11. A color framing pulse generator according to claim 10 including a second switch means selectively connected between the outputs of said first flip-flop and a constant current source, a capacitor connected to the output of said second switch and a referenced potential, a decoder, an analog to digital converter connected to said second switch and supplying an output to said decoder, and said decoder connected to said illuminating means.

* * * * *